(12) United States Patent
Kataoka et al.

(10) Patent No.: US 7,731,589 B2
(45) Date of Patent: Jun. 8, 2010

(54) GAME APPARATUS, SERVER APPARATUS, PROGRAM, AND RECORDING MEDIUM

(75) Inventors: Hiroshi Kataoka, Tokyo (JP); Hiroshi Masui, Tokyo (JP); Yusuke Shimizu, Tokyo (JP); Takeshi Maruyama, Tokyo (JP); Masayuki Ao, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 1204 days.

(21) Appl. No.: 10/476,693

(22) PCT Filed: May 9, 2002

(86) PCT No.: PCT/JP02/04532

§ 371 (c)(1),
(2), (4) Date: Mar. 31, 2004

(87) PCT Pub. No.: WO02/089937

PCT Pub. Date: Nov. 14, 2002

(65) Prior Publication Data

US 2004/0157654 A1      Aug. 12, 2004

(30) Foreign Application Priority Data

May 9, 2001     (JP)     ............................. 2001-139363

(51) Int. Cl.
*A63F 13/00*     (2006.01)
(52) U.S. Cl. .......................................... 463/42; 463/43
(58) Field of Classification Search .................... 463/42, 463/43; 715/758; 709/204
See application file for complete search history.

(56) References Cited

U.S. PATENT DOCUMENTS 5,114,155 A * 5/1992 Tillery et al. ................. 273/371

(Continued)

FOREIGN PATENT DOCUMENTS

EP            0 885 638 A1      12/1998

(Continued)

OTHER PUBLICATIONS

Supplementary European Search Report issued by the European Patent Office, dated Dec. 22, 2005, for European Patent Application No. 02724750.1.

(Continued)

*Primary Examiner*—Peter DungBa Vo
*Assistant Examiner*—Masud Ahmed
(74) *Attorney, Agent, or Firm*—Finnegan, Henderson, Farabow, Garrett & Dunner, LLP (57) ABSTRACT

An object of the present invention is to provide a game server that can simulate the sensation of competing in a game against an actually existing specific person. The game server of the present invention offers a plurality of options for the actions that gamer A can select in game scenes that change along with the progress of a soccer game. The options include dribble (long), dribble (short), pass in front of the player, pass to the foot of the player, wait, and shoot. The action patterns of gamer A are stored for each game scene by counting the number of times each option is selected. The game server refers to the stored action patterns when playing against another gamer B. This configuration makes it possible for the gamer B to have a virtual experience as if he were competing with the gamer A.

6 Claims, 7 Drawing Sheets

U.S. PATENT DOCUMENTS

| | | | |
|---|---|---|---|
| 6,162,120 A * | 12/2000 | Takahashi et al. | 463/8 |
| 6,371,854 B1 * | 4/2002 | Ikeda et al. | 463/42 |
| 6,659,873 B1 * | 12/2003 | Kitano et al. | 463/42 |
| 6,695,702 B2 * | 2/2004 | Morita | 463/41 |
| 6,840,861 B2 * | 1/2005 | Jordan et al. | 463/42 |
| 6,848,997 B1 * | 2/2005 | Hashimoto et al. | 463/42 |
| 6,881,148 B2 * | 4/2005 | Yotsugi et al. | 463/42 |
| 2002/0090985 A1 * | 7/2002 | Tochner et al. | 463/1 |
| 2002/0090996 A1 * | 7/2002 | Maehiro | 463/42 |
| 2002/0160837 A1 * | 10/2002 | Matsuno et al. | 463/42 |
| 2002/0160838 A1 * | 10/2002 | Kim | 463/42 |
| 2003/0060283 A1 * | 3/2003 | Rowe | 463/42 |
| 2003/0149619 A1 * | 8/2003 | Stanley et al. | 705/14 |
| 2004/0043806 A1 * | 3/2004 | Kirby et al. | 463/6 |

FOREIGN PATENT DOCUMENTS

| | | |
|---|---|---|
| EP | 1 029 571 A2 | 8/2000 |
| EP | 1 052 588 A2 | 11/2000 |
| EP | 1 066 867 A2 | 1/2001 |
| JP | 8-299525 | 11/1996 |
| JP | 11-4969 | 1/1999 |
| JP | 2000-42253 | 2/2000 |
| JP | 2000-140433 | 5/2000 |
| JP | 2000-189673 | 7/2000 |
| JP | 2000-300851 | 10/2000 |
| KR | 1999-0064794 | 8/1999 |
| KR | 2001-0067847 | 7/2001 |
| WO | WO 00/16208 A1 | 3/2000 |
| WO | WO 00/64173 | 10/2000 |
| WO | WO 00/67867 A2 | 11/2000 |
| WO | WO 00/79464 A1 | 12/2000 |

OTHER PUBLICATIONS

Supplementary Partial European Search Report issued by the European Patent Office on Aug. 5, 2005, in EP application No. 02 72 4750.1.

"Fighting Bujutsu," The Amusement Industry, vol. 26, No. 10, p. 140, Oct. 1997.

International Search Report issued in International Application No. PCT/JP02/04532 on Sep. 3, 2002.

"Advent of Great Waves of Mobile Phones," YK Amusement Journal, Japan, May 30, 2001, vol. 1, No. 2, pp. 131-133 (6 pages).

"Arcade Introduction," Play Station Virtual Fighter 4 Perfect Guide, Softbank Publishing, Inc., Japan, Mar. 12, 2002 (pp. 260-261) (4 pages).

"VF.NET," "New Way to Enjoy Games Using i-mode," Dengeki Play Station, Media Works Inc., Japan Aug. 31, 2001, vol. 7, No. 22, Issue 181, p. 219 (5 pages).

"Can a New Trend be created in Arcade Games?," Gekkan Arcadia Enterbrain, Inc., Japan, Jul. 1, 2001, vol. 2, No. 7, Issue 14, pp. 25-28 (9 pages).

Search Report issued from the European Patent Office in European Application No. 09005995.7 - 2218, dated Sep. 29, 2009 (7 pages).

* cited by examiner

GAME APPARATUS, SERVER APPARATUS, PROGRAM, AND RECORDING MEDIUM

TECHNICAL FIELD

The present invention relates to a game apparatus, server apparatus, and program for playing a game via a communication network.

BACKGROUND ART

Web page viewing, sending and receiving of email, ticket reservations, music data distribution, game program distribution, and other types of application service are recently being provided using Internet access from mobile communication terminals with Web browsing capabilities. Gamers can connect to a game server on a network from a mobile communication terminal and play online games by downloading a game screen by communication with a game server via HTTP (Hyper Text Transfer Protocol).

With conventional online games, when a gamer connects to a game server to play a soccer game or other such competitive game, the gamer competes with a computer. As with a soccer game, a game in which the progress of the game varies depending on the leadership role of the coach strongly reflects the individuality of the coach, making the game more enjoyable when the gamer competes with an actual person, as opposed to competing with the computer.

Internet discussion boards, mailing lists, and the like are used as forums to provide communication for gamers, but these discussion boards, mailing lists, and the like are supervised by site managers and are not provided by the gamers. Therefore, it can be expected that communication among the gamers can be stimulated by providing a homepage exclusively for gamers.

In the past, gamers could not know of the level of popularity of a game in a video arcade, the number of players, video arcades with competitive gamers, video arcades with many gamers at a similar level, video arcades with many skilled gamers, or the like without actually going to the video arcade, and therefore gamers could not determine the situation of the video arcade in advance.

Therefore, an object of the present invention is to provide a technique capable of simulating the sensation of playing with a live person. Another object of the present invention is to provide a technique for stimulating communication among gamers and for providing an incentive for gamers to participate. Yet another object of the present invention is to provide a technique for providing an incentive for gamers to participate by providing information about business conditions of gaming establishments and about gamers playing at those establishments.

DISCLOSURE OF THE INVENTION

Aimed at achieving the aforementioned objects, the game apparatus of the present invention comprises recording means for recording action patterns reflecting the tendency of game development implemented according to operating information of a first player, and game processing means for playing the game with a second player based on the action patterns. Recording the action patterns of the first player in advance makes it possible for the second player to have a simulated experience as if he were playing against another player.

The aforementioned configuration may further comprise presentation means for presenting a plurality of options for the action the player can take in each game scene. The configuration in question makes it possible for the action patterns to be statistically calculated by the number of times options are chosen.

With the present invention, it is also possible to provide a program for enabling a computer system to function as each of the aforementioned means. The program in question can be recorded in a computer-readable recording medium. Examples of such recording media include optical recording media (CD-ROM, CD-RAM, DVD-ROM, DVD-RAM, DVD-R, PD disks, MD disks, MO disks, and other such recording media capable of optically reading data), magnetic recording media (flexible disks, magnetic cards, magnetic tape, and other such recording media capable of magnetically reading data), memory cartridges comprising a memory element (a semiconductor memory element such as DRAM, or a ferroelectric memory element such as FRAM), and other such portable recording media, as well as internal recording devices provided within the computer or to the memory card or the like, or external recording devices such as hard disks.

The server apparatus of the present invention is a server apparatus for opening Web pages in response to viewing requests from a terminal apparatus connected to a communication network, comprising means for creating a homepage for the gamer, means for obtaining scores of the game played by the gamer through the homepage, and means for expanding the functions of the gamer's homepage according to the scores. Expanding the functions of the homepage according to the game scores provides an incentive for the gamer to participate in the game. Through the homepage, the gamer can also stimulate communication and provide an incentive for game participation.

The server apparatus of the present invention comprises means for obtaining information pertaining to gamers playing games in a gaming establishment or information pertaining to business conditions of the gaming establishment from commercial video game machines in the gaming establishment via a communication network, and means for distributing this information to terminal apparatuses connected to the communication network. Since the configuration in question makes it possible for gamers to obtain information for identifying gamers playing games at a gaming establishment, game scores, the number of gamers playing a game, and other such information from a terminal apparatus connected to a communication network, the gamers can search for video arcades with popular games, video arcades with competitive gamers, video arcades with many gamers at a similar level, video arcades with many skilled gamers, and the like.

The server apparatus of the present invention also comprises means for obtaining game scores of gamers playing games in the gaming establishment from commercial video game machines in a gaming establishment, and means for identifying the gamers at a specific level when the game scores thereof meet a specific predetermined standard. The configuration in question can provide an incentive for game participation because gamers are identified as gamers of a specific level when they reach a certain level.

An incentive for gamers to participate in a game can also be created by further providing means for freshly identifying a gamer as a gamer with a specific level when the gamer's game score surpasses the game score of the gamer at the abovementioned specific level.

The server apparatus of the present invention is a server apparatus for networking with a game machine comprimising a function for backing up specific data needed for a game procedure on a recording medium, and comprises backup means for preserving a copy of the backup data recorded on the recording medium. The configuration in question allows gamers to play games based on the backup data recorded on the recording medium even if the game machine cannot be networked with the server apparatus.

BEST MODE FOR CARRYING OUT THE INVENTION

The present embodiment is described below with reference to the figures.

Figure 1:
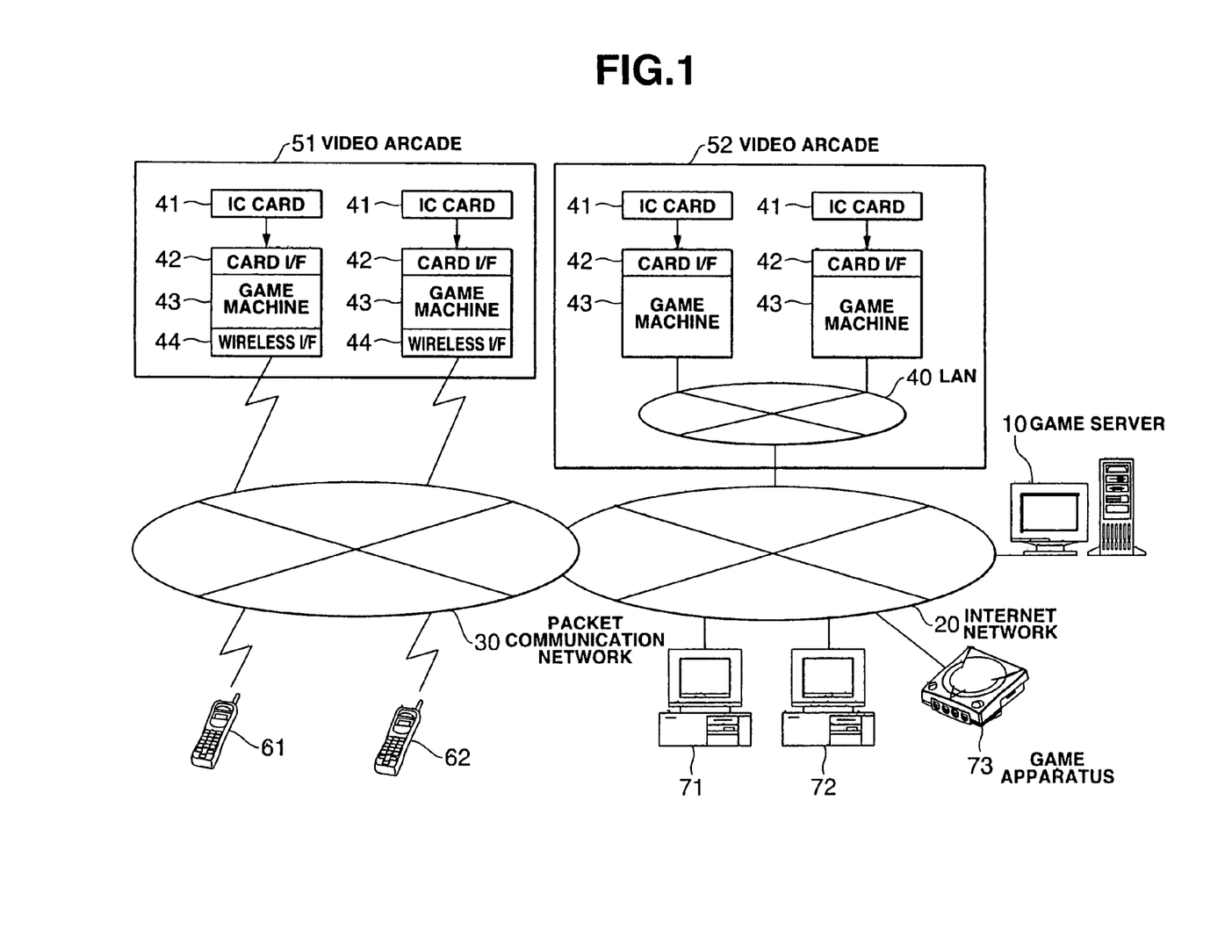
FIG. 1 is a block diagram of the game system network.

FIG. 1 is a block diagram of the game system network. In this diagram, the symbols 51 and 52 denote gaming establishments in separate areas (nationwide prefectures, all municipalities, the Tokyo 23 wards, etc.), for example, video arcades (amusement centers). A plurality of arcade game machines 43 is found in each video arcade. The arcade game machines 43 are commercial video game machines comprising large display screens, and gamers can play the game by inserting coins. In the present embodiment, the arcade game machines 43 found in areas nationwide are networked with a game server 10, and game environments can be created using IC cards 41 in order to offer a new network game environment. In addition to being able to play games by inserting coins into the arcade game machines 43, gamers can also execute games by using the IC cards 41. These IC cards 41 are made from plastic cards with embedded IC chips, and comprise a recording medium (optical recording medium such as CD-RAM, magnetic recording medium such as a magnetic card, or semiconductor memory) for storing the gamer's game history and the like. Each IC card 41 is allocated a unique card ID.

Furthermore, the present embodiment employs a portable terminal, such as a portable phone, PHS, or PDA, as individual authentication means for authenticating gamers. The portable terminal is allocated a telephone number, a MAC address, or other such unique identifying information (hereinafter referred to as "a terminal ID"), which makes it possible to authenticate individuals using the terminal ID. Gamers can subscribe by networking to the game server 10 from a portable phone 61 and inputting certain keys (for example, keying-in a card ID, birth date, character name, or the like) according to an instructional screen shown on the display of the portable phone 61. For subscribed gamers, the game server 10 allocates identification information (for example, a user ID) for associating the card ID of the IC card 41 of the subscribed gamer with the terminal ID of the portable phone 61 and uses the information for data processing. Card ID is used as identification information in the case of gamers who have not subscribed. When a subscribed gamer initiates game play by inserting the IC card 41 into a card interface 42 in the arcade game machine 43, various types of information relating to the gamer's game play are sent to the game server 10 to be managed by each subscribed gamer. In case connection to the server is not possible, the minimum information necessary for the gamer to play the game (game history or the like), which is one of the various types of information relating to the gamer's game play, is written onto the IC card 41 by the arcade game machine 43, which makes it possible for gamers to continuously enjoy the game even if connection to the server is not possible. Furthermore, subscribed gamers can be provided with various types of service, such as mail delivery from the game server 10, and can configure, modify, or reconfigure various types of information relating to the game play of the gamers registered on the server. For example, a configuration relating to the character can be modified (as in changing the color of the character's outfit, equipping the character with a specific item (such as a weapon), or the like) using the portable terminal. Configuration can of course be possible on the game machine, but from a business standpoint, income increases with players who finish game play in a short time and play over again many times, so it is preferable to avoid performing operations other than game play on a commercial video game machine. Otherwise players will occupy the game machine with operations other than game play, and the number of games played by the player will decrease, causing sales to fall. From a user's standpoint, it is more convenient to configure or modify at home or out of doors with a portable phone, rather than going to the gaming establishment to configure or modify (sometimes it is necessary to wait for the game machine to become available when the gaming establishment is crowded). Therefore, there are merits in having the game apparatus leave only game play up to the player, while other configuration is done at the portable terminal.

Conversely, when a gamer who has not subscribed initiates game play by inserting the IC card 41 into a card interface 42 in the arcade game machine 43, various types of information relating to the gamer's game play are sent to the game server 10 to be managed for each card ID. When connection to the server is not possible, the minimum information necessary for the gamer to play the game (game history or the like), out of the various types of information relating to the gamer's game play, is written onto the IC card 41 by the arcade game machine 43 in preparation for the next time the game is played, which makes it possible for gamers to continuously enjoy the game even if connection to the server is not possible.

When a gamer inserts the IC card 41 into the card interface 42, the card ID is sent to the game server 10 via a communication network, and a card data table is searched to authenticate the gamer. A new card ID is newly registered in the card data table. If the gamer is identified as a member (in the case of nonmember gamers, if the card ID is identified to be already registered), either the data-recorded in the IC card 41 or the data registered in the server will take precedence to be reflected in the game. Which data actually does so is configured in advance, so the game reflecting the data starts based on this designation. The question of whether the data recorded in the IC card 41 or the data registered in the server will take precedence to be reflected in the game need not be configured in advance, but may be determined by a calculation in accordance with certain conditions. For example, it is possible to record information relating to the time at which various data was recorded, and to make the determination based on this information.

After the game is finished, various types of information (hereinafter referred to as "play information"), such as the title of the game the gamer is playing, the gamer's game score, level, items, the location of the video arcade, and the time of play, is sent to the game server 10 (during the game, the gamer's operating information (operating history) may also be sent to the server). The minimum necessary information is selected from the play information and written onto the IC card 41. As shown in the figure, the arcade game machines 43 located in the video arcade 51 are connected to a packet communication network 30 via wireless interfaces 44. The gamer's play information is transmitted from the corresponding arcade game machine 43 to the game server 10 via the corresponding wireless interface 44, packet communication network 30, and Internet network 20. The packet communication network 30 is designed to be capable of packet communication by being provided with a base station for establishing a wireless connection with digital portable phones 61 and 62 equipped with Web browsing capabilities, a packet switch for packet routing within the network, and a home memory station for registering the location of the digital portable phones 61 and 62, as well as a packet processing module (PPM) or packet gateway (PGW). The PGW is installed in the interface with the Internet network 20.

At the same time, the arcade game machines 43 located in the video arcade 52 are mutually connected by a LAN (Local Area Network) 40 composed of an Ethernet cable, a repeater, a router, a switching hub, and the like assembled on the premises, and is furthermore connected via the router to the Internet network 20, which is an external network. The gamer's play information is transmitted from the corresponding arcade game machine 43 to the game server 10 via the LAN 40 and the Internet network 20. Data communication between the arcade game machine 43 and the game server 10 complies with TCP/IP for an open network.

The game server 10 is a server apparatus equipped with a HTTPd (Hyper Text Transfer Protocol daemon), and functions as a WWW (World Wide Web) server. The game server 10 obtains play information from the arcade game machines 43 located in the video arcades 51 and 52, and multicasts the information to pre-subscribed users' terminal apparatuses (Web client). Examples of such terminal apparatuses include multipurpose terminal apparatuses 71 and 72, such as a personal computer or notebook computer connected to the Internet network 20, and the digital portable phones 61 and 62 connected to the packet communication network 30. The terminal apparatuses 71 and 72 are connected to the Internet network 20 via a modem apparatus or a network terminal apparatus such as a DSU (Digital Service Unit) or TA (Terminal Adapter). Though not shown in the figure, information can also be delivered to a PHS (Personal Handy Phone), PDA (Personal Data Assistance), or other portable information terminal apparatus (mobile communication terminal apparatus) or device having Internet connectivity.

Play information delivered to the user's terminal apparatus is compiled as content description markup language, such as HTML (Hyper Text Markup Language) or XML (extensible Markup Language) developed for use with a multipurpose terminal apparatus such as a personal computer, or Compact HTML, HDML (Handheld Device Markup Language), WML (Wireless Markup Language) or another type of language developed for use with a portable terminal apparatus such as a digital portable phone, and is delivered as a Web page to which visual data such as a GIF (Graphics Interchange Format), a JPEG (Joint Photographic Experts Group), and a PNG (Portable Network Graphics) are linked.

The play information delivered as a Web page contains the name or nickname of the gamer, the title of the game the gamer is playing, the game score, the location of the video arcade, the play time, and the like, making it possible for people browsing the aforementioned Web page to know in real time who is playing what game, when, and where. From the play information, the game server 10 can also calculate and deliver the competitive conditions at video arcades (score records and the like), the operating rate (actual number of players/possible number of players), and other types of information. In addition to the operating rate, information concerning congestion, such as "vacant," "normal," or "crowded," can also be delivered as mail to the digital portable phone 61. The user can connect to the game server 10 via the Internet network from a digital portable phone or other such terminal apparatus, and can search for popular video arcades, video arcade with competitive gamers, video arcades with many gamers at a similar lever, video arcade with many skilled gamers, and the like using the search function. The game server 10 can also tabulate the rankings of the game scores in each area and release the top scorers over the Internet. This allows gamers to know their own game level, which can provide an incentive for gamers to participate while striving for the top score ranking. The system may also be configured such that when gamers do not know the location of the video arcade, they can download a map or the like with directions to the video arcade from the game server 10.

Figure 2:
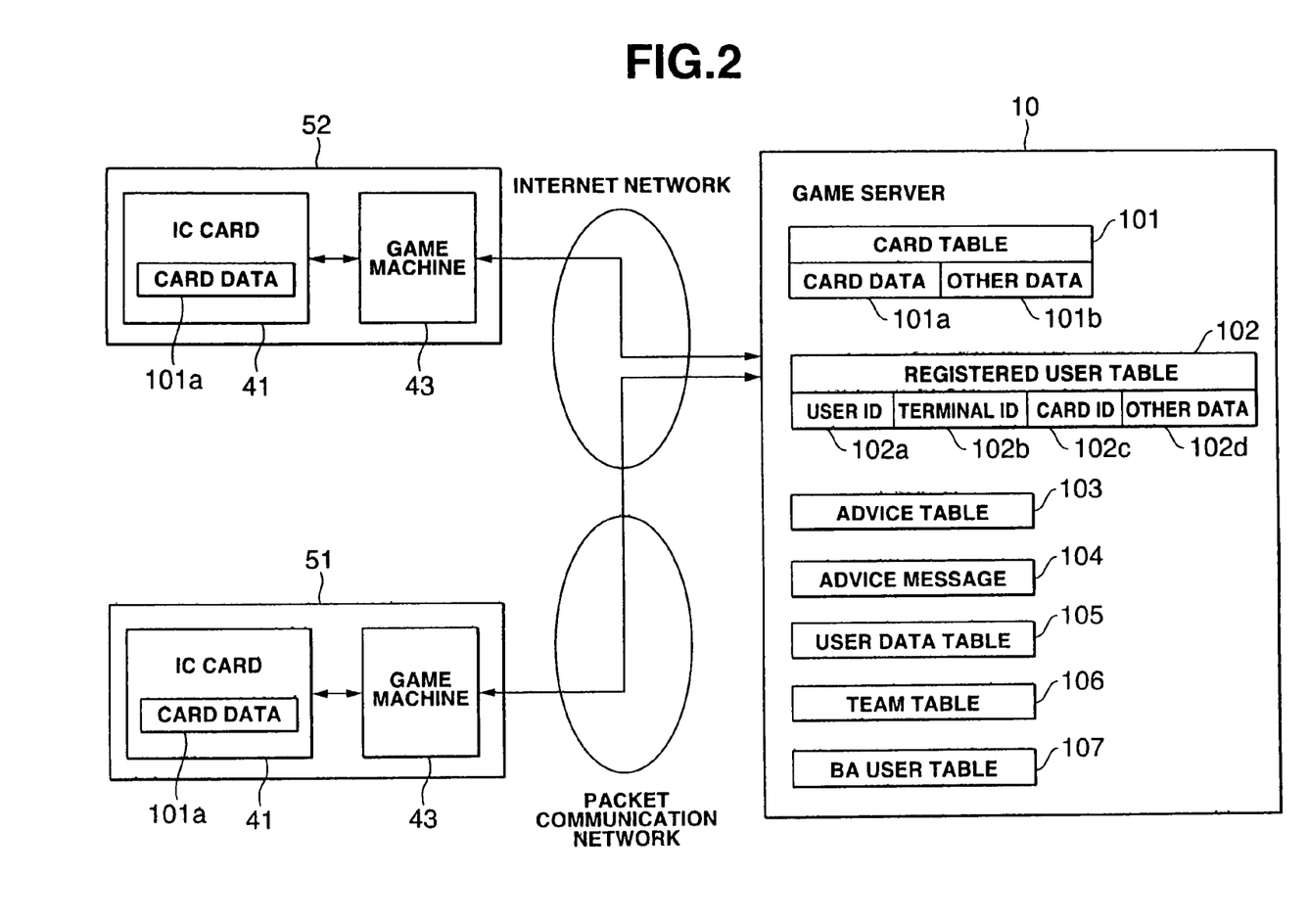
FIG. 2 is an explanatory diagram of the various types of information managed by the game server.

FIG. 2 is an explanatory diagram of the various types of information managed by the game server 10. Registered in the game server 10 are card table 101, a registered user table 102, an advice table 103, an advice message 104, a user data table 105, a team table 106, and a BA user table 107. The card table 101 is a table for updating the game history and other game parameters every time the gamer plays the game, and registered therein are card data 101a containing the card ID of the IC card 41, the level of the gamer, the experience value, the number of wins, and the like, and other data 101b containing match history, store history, evaluation of gamers, and the like. As used herein, "match history" refers to setting a mark flag on the match history recorded in the server by executing a specific button operation on the game machine when the match finishes. "Evaluation" refers to the concept of being able to vote on the evaluation criteria of predetermined terms ("technician," "tricky," and the like) concerning the competitor recorded in the match history, and the person being evaluated can see the tabulated results of the votes. The card data 101a is registered in the card table 101, and a copy thereof is also recorded on the IC card 41 via the Internet network 20 and/or the packet communication network 30. In addition to sending the card data 101a to the server from the game machine 43 and registering the data in the card table, it is also acceptable to record the same data directly in the IC card 41 from the game machine 43. In other words, when the gamer finishes playing the game, the newest card data 101a at the time is backed up on the IC card 41. Since the card data 101a is selected in advance in a predetermined volume as the minimum information necessary to play the game, gamers can continue to enjoy game play using the card data 101a recorded on the IC card 41 even when problems arise in the network and the arcade game machines 43 cannot connect to the game server 10.

The registered user table 102 is a table for subscribed gamers to record their registration conditions, and recorded therein are a user ID 102a, a terminal ID 102b, and a card ID 102c, as well as the date of subscription, license expiration date, and other data 102d. Gamer information within the server is managed through the centrally unified user ID 102a. Therefore, even if a gamer's IC card 41 is lost and then found by a third person who attempts to play a game using the IC card 41, unlawful use by the third person is prevented because the third person cannot verify himself to be the owner due to the individual authentication by the terminal ID using a portable phone or the like. Since the terminal ID 102b and the card ID 102c are linked by the user ID 102a, the lost IC card 41 is inactivated, and a new IC card 41 can be activated.

The advice table 103 is a table for sending beneficial advice about game play as mail to the terminal apparatus of a subscribed gamer. In the present specification, advice sent as mail will be referred to as "advice mail." Data reflecting the action patterns of gamers is recorded on the advice table 103. For example, the number of times a type of attack is used during the match, the number of times a type of attack fails, the number of times a type of damage was incurred, and the like are recorded in the case of a fighting game. With a soccer game, the shot success rate, dribbling skill, pass accuracy, and the like are recorded. The game server 10 statistically evaluates these data and analyzes the gamer's strengths and weaknesses. For example, in a game setting near the goal, when the probability of a successful shot is low but the gamer is still highly likely to opt for shooting, advice is mailed such as "the probability of scoring by you in front of the goal is low, don't rush but make a pass to one of your teammates." The game server 10 can also be designed to analyze the weaknesses of the gamer's opponent from the action patterns of the opponent, and mail a strategy for winning. For example, when the opponent has a low probability of succeeding with a dribble cut near midfield, advice is mailed such as "your opponent is bad at midfield dribble cuts, try breaking through his dribble." This advice is prepared in a plurality of patterns as a prewritten advice message 104, and the game server 10 selects an appropriate message from the above-mentioned analyzed results and delivers the message to the gamer's terminal apparatus.

The user data table 105 is a table for recording basic information about subscribed gamers, and registered therein are the user ID, the nickname of the characters appearing in the game, the gamer's birth date, winning points, and the like. The team table 106 is a table for registering basic information about a team. In the present embodiment, a plurality of gamers can participate to form a team (group, association) and can compete for game scores as a team. Anyone can form a team, and a team is created by registering a team name and password in the game server 10. The institutor of the team becomes the leader, and other gamers can join the team by obtaining the "team name" and "password" from the leader or the like. When there is a plurality of teams, gamers can belong to only one team. The sum of the game scores of all the gamers on a team becomes the game score of the team. The game score of the team is tabulated in the game server 10 in team units at every video arcade in various areas, and the ranking of the top scoring team is made available. Tabulating the game scores in every video arcade allows video arcades incorporating this system to provide an incentive for gamers to participate in the game.

Furthermore, the game scores of all the gamers on a team are tabulated in the game server 10 and the rankings are displayed. Gamers of a similar skill level form a team and compete for game scores within the team, whereby the gamers can reasonably compete for game scores, focus on improving their skills, and become better motivated to participate in the game. Allowing the game scores of the team members to be browsed through makes it possible to provide a forum for communication among the garners and to increase motivation for game participation.

The BA user table 107 is a table for recording data relating to managing the progress of a mini-game for playing on a portable phone or other such terminal apparatus. This mini-game is a simulation game for developing a character. The ID and other characteristics of the character appearing in the mini-game are recorded in the BA user table 107. The gamers can use the game scores of the mini-game to obtain melodies of incoming calls and wallpaper for portable phones, virtual currency used in the game, and items that can be used in the video arcade.

In the present embodiment, gamers whose game scores have reached a certain level are certified as certified players and assigned a title. The titles of certified players can be assigned as the "area name+character name." For example, a gamer who has achieved a superior game score at a video arcade in Shinjuku is certified as "Shinjuku Jackie." This certified player is certified by the same name at any other area and is known as a charismatic player among gamers. However, if another gamer reaches the same level as the certified player, he faces off against the certified player and can take his title and succeed to his name by defeating the certified player. In the example described above, the one who defeated "Shinjuku Jackie" would then be certified as "Shinjuku Jackie The Second." Thus, certifying the person with the highest game score in each area as the certified player would induce competition over the title in each area and provide an incentive for gamers to participate in the game. The system may also be designed such that wallpaper that authenticates the identity of a certified player is transmitted to the digital portable phone of the certified player.

When a gamer achieves a specific level game score or competes with the certified player and wins, the gam-e server 10 writes information into the gamer's IC card 41 stating that he is the certified player. Thus, when the certified player plays a game at a video arcade, the certified player's game score, the location of the video arcade where the game is being played, and other such information is transmitted in real time to the game server 10 from the arcade game machine 43 via the communication network. A web page stating "Shinjuku Jackie is at the - - - - video arcade!!" is created on the game server 10 from this information and is delivered in real time to the terminal apparatuses 71 and 72 and digital portable phones 61 and 62 via the internet network 20 and the packet communication network 30. The Web page delivered to the users contains a photograph and profile of the certified player, the location at which the certified player is currently playing, video arcades frequented by the certified player, his game scores, and other such information. Thus it can be expected that gamers will-gather at the - - - - video arcade when a user who has obtained information relating to the certified player says "I want to see the certified player play!" or "I want to challenge the certified player!" This can stimulate communication among gamers and provide them with an incentive to participate in the game.

Furthermore, the system may be designed to deliver to the users, in addition to the above-mentioned information, methods for winning fighting games (technique descriptions, commands, damage, duration, characters' basic attributes (height, weight, fighting stance, movement speed, jump strength)), event information, wallpaper of characters appearing in the game, melodies of incoming calls, and the like.

A scenario of delivering Web information to the digital portable phones 61 and 62 from the game server 10 is described in the example above, but the system need not be limited as such and may, for example, be designed such that a game program (Java applet) resident in the digital portable phones 61 and 62 can periodically access the game server 10 and make Web information available. In the description above, gamers were identified using IC cards 41, but the system need not be limited as such and may, for example, be designed such that gamers are identified by registering beforehand in the game server 10 with a password, and then entering the password when playing the game.

Since the video arcades 51 and 52 are connected to the game server 10 via the communication network, minute changes and the like in the game program can be immediately responded to by appropriately downloading programs for fixing bugs in the game program, modified programs for version upgrades, new character data, or the like from the game server 10.

Figure 3:
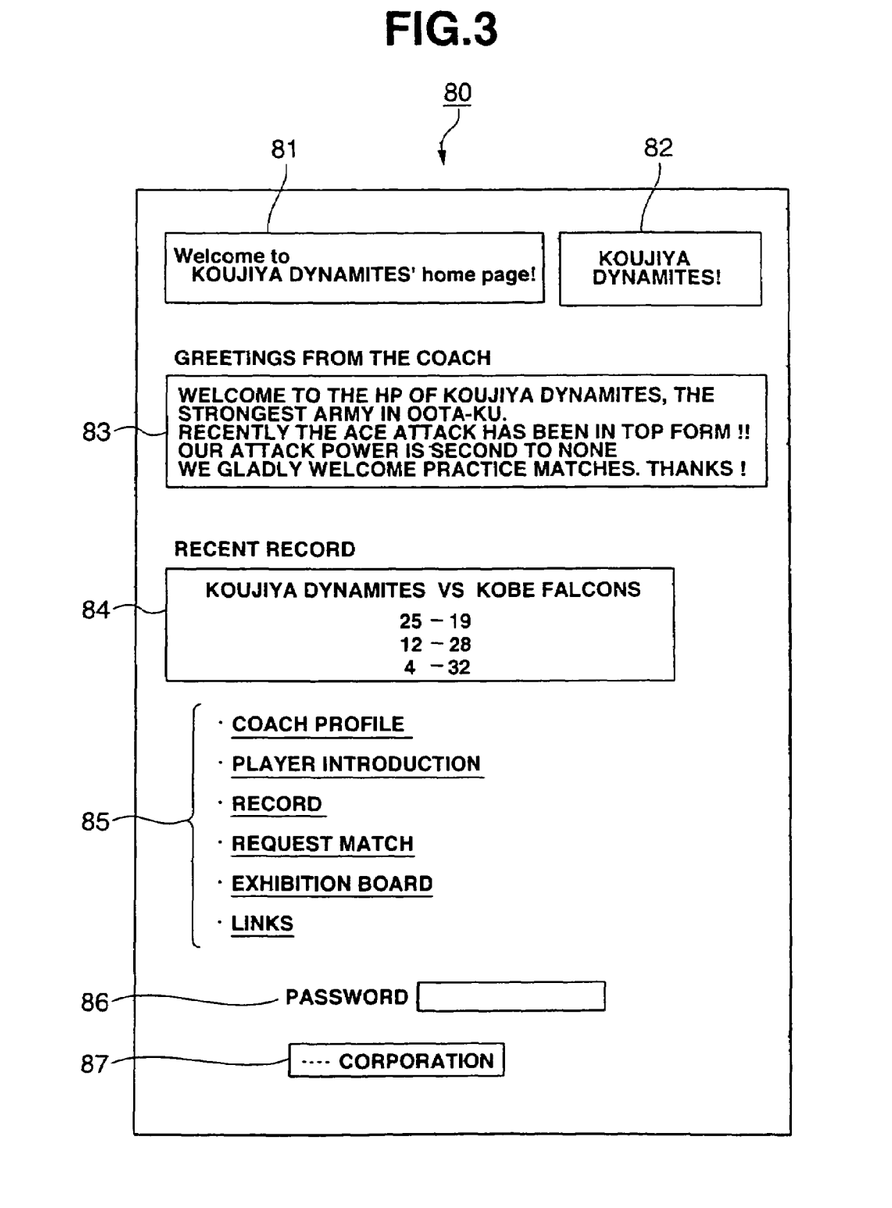
FIG. 3 is an explanatory diagram of the gamer's homepage.

In the present embodiment, the game server 10 creates the user's home page and can also release it to a third person. The user establishes a network connection to the game server 10 from either a home game machine 73 with communication functions or the terminal apparatuses 71 and 72 via the internet network 20, and inputs his name, address, and other such necessary information. The user's home page is then automatically created on the game server 10. This home page functions as a contact point when the user plays a game via the network, and this home page is used to request game participation, to display game results, and the like. FIG. 3 shows one example of a home page. The home page 80 displays a heading 81, a logo mark 82, a comments section 83, a game score column 84, links 85, an authentication password input column 86, and a banner advertisement 87.

Various site or image URL's (Uniform Resource Locator) designated by HTML tags are embedded in the links 85, and users can access a third person's home page and make requests for competitive games or the like. The match results are displayed on the game score column 84. The displayed contents are extremely limited during the initial stages of creation, but the home page 80 is designed such that users can use home page creation support tools and can expand the functions of the home page 80 when the users achieve high game scores or frequently access a third person's home page 80 by participating in network competitions or the like.

For example, the layout of the home page 80 can be freely defined by using JavaScript, JScript, VBScript, and other such script language to describe the script in the HTML, by moving and displaying text, and by using style sheets to define font type, size, color, typeface, text modification, wallpaper, table or frame modification, block element positioning (centering and the like), range of white space (margins), and the like. HTML information displayed in the browser may by dynamically expressed by using a DOM (Document Object Model) to define writing, images, sound, and other such Web page content elements as objects and controlling them with the script. Specifically, it is also possible to give color to the text and graphics used in the heading 81 and logo mark 82, and to describe the user's self-introduction, profile, and the like in the comments section 83 as the functions of the home page 80 are expanded. Such editing is done by entering a password in the authentication password input column 86 to identify the user.

Users can hold game tournaments on the network using this home page 80. A game tournament bears the name of the user who won the last game tournament. Requests to participate in the game tournament are also made on the user's home page. This setup makes it possible for users to hold a game tournament on their own home page by winning a game tournament, and therefore the user can expect an increase in third person access and can further expand the functions of the home page 80. Communication among users can be stimulated because their profiles, game scores, and the like are posted on the home page 80.

Another incentive for users to participate in the game can be provided by supplying the winner of a game tournament with a virtual soccer stadium, and setting rules that state, for example, that the user loses the stadium if he does not win again. Communication among users can be stimulated and an incentive for game participation can be provided by configuring the system such that users can exchange player characters (virtual game characters modeled after soccer players) from the game amongst themselves via the network. Providing mutual links between users' home pages allows them to know what kind of games other users are playing, what skill level the other users are at, and the like, which can stimulate communication among users.

The home page 80 can be browsed from digital portable phones and other such mobile communication terminals, and users can access the home page 80 from anywhere at anytime. This allows users to access their own home page 80, to process game character data, to connect to the game server 10 and play the game via the network, to access another home page and request to participate in the game, or the like whenever they have time.

Next, a game method will be described for establishing a network connection to the game server 10 and playing a soccer game. Examples of possible terminal apparatuses for connecting to the game server 10 include mobile communication terminals such as the digital portable phones 61 and 62, personal computers and other such multipurpose terminal apparatuses 71 and 72, and home game machines 73. A scenario will now be described in which a game is played by connecting to the game server 10 from the digital portable phone 61.

Figure 4A:
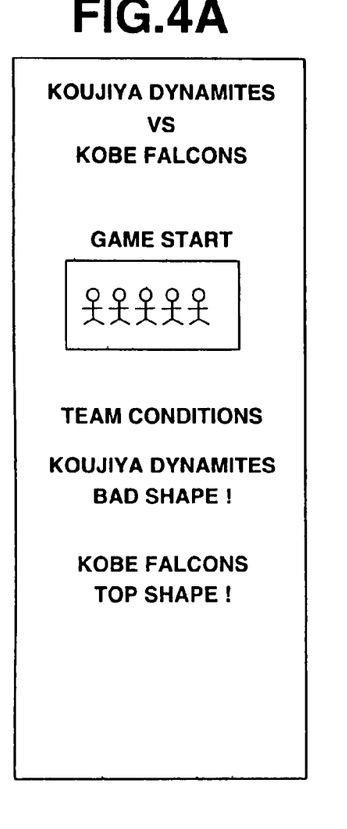
FIG. 4 is a screen transition diagram of a game screen displayed on a portable phone.

FIG. 4 is a transition diagram of a screen displayed on the portable phone 61. FIG. 4A is a game opening screen displayed after the digital portable phone 61 establishes a wireless connection with the game server 10 through PPP (Point to Point Protocol), and a one-time password or other such specific authentication procedure based on CHAP (Challenge Authentication Protocol) is completed. This example shows a scenario in which "The Koujiya Dynamites" and "The Kobe Falcons" are competing. "The Koujiya Dynamites" is a soccer team controlled by a gamer, and the gamer plays the game as the coach by giving directions to the player characters. "The Kobe Falcons" are a soccer team controlled by the game server 10, and the game server 10 plays the game by giving directions to the player characters based on the action patterns of a third person. Details of the action patterns will be described later.

Figure 4B:
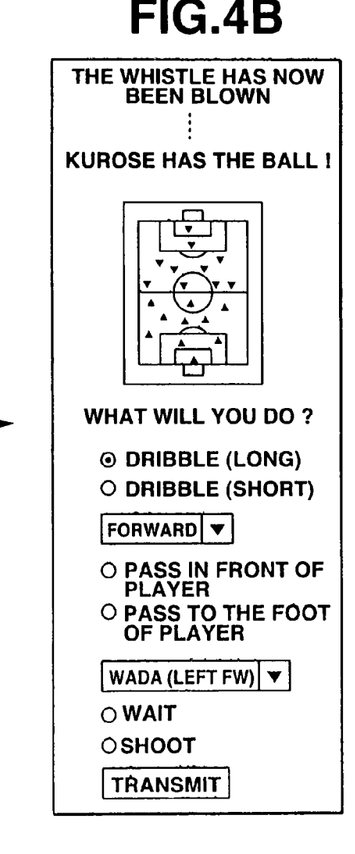

FIG. 4B is a display screen at the time of kickoff, and shows a situation in which the FW player character takes possession of the ball as the whistle blows. From the middle of the screen to the bottom are displayed six action choices that the player character in possession of the ball can then take. The six choices are "dribble (long)," "dribble (short)," "pass forward," "pass backward," "wait," and "shoot." This example assumes the gamer selected "dribble (long)," and then selected "forward" as the dribble direction from a pull-down menu listing the options "forward," "left-forward," "right-forward," "left," "right," "backward," "left-backward," and "right-backward."

Figure 5:
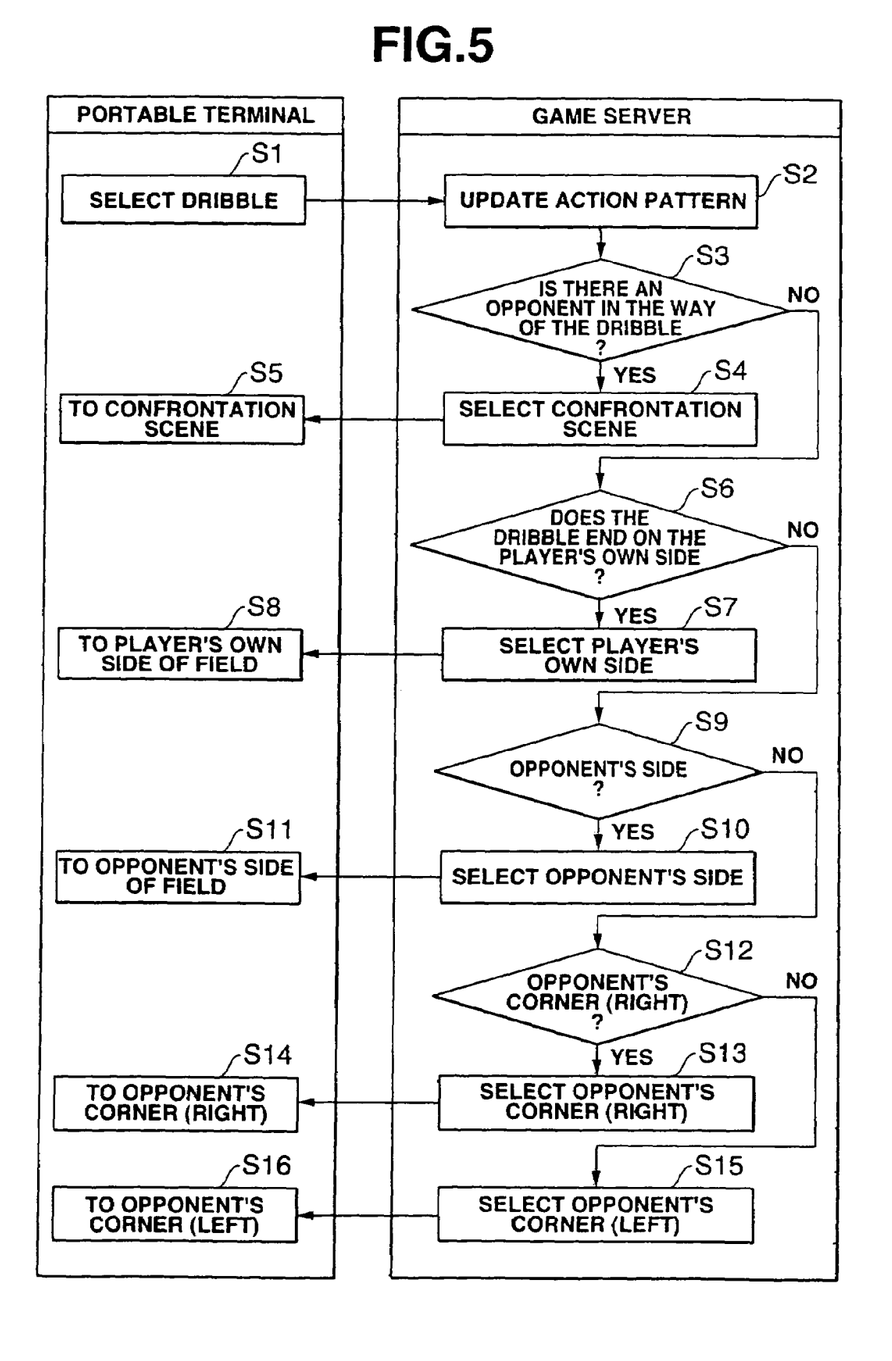
FIG. 5 is a diagram of the correspondence between a portable phone and the game server.

FIG. 5 is a diagram of the correspondence between the digital portable phone 61 and the game server 10. At kickoff, if the gamer selects "dribble (long)" from the options and selects "forward" as the dribble direction (S1), the game server 10 updates the action patterns of the gamer (S2). In the present specification, the term "action patterns" refers to the probability, statistically calculated from past history, that the gamer will choose a certain option from a plurality of options. The game server 10 statistically records what option the gamer chose in a certain scene in past games and successively updates the action patterns.

When a player character of the opposing team is in the way of a player character's dribble (S3; YES), the game server 10 selects a confrontation scene (S4) and transmits it to the digital portable phone 61 (S5). When there is no player character of the opposing team in the way of a player character's dribble (S3; NO), it is determined whether or not the end of the dribble is on the player's own side of the field (S6). If it is on the player's own side (S6; YES), a game scene of the player's side is selected (S7) and transmitted to the digital portable phone 61 (S8). When it is not on the player's own side (S6; NO), it is determined whether or not it is on the opponent's side of the field (S9). When it is on the opponent's side (S9; YES), a game scene of the opponent's side is selected (S10) and transmitted to the digital portable phone 61 (S11). When it is not on the opponent's side (S9; NO), it is determined whether it is on the opponent's right or left corner (S12). If it is on the opponent's corner (right) (S12; YES), a game scene of the opponent's corner (right) is selected (S13) and transmitted to the digital portable phone 61 (S14). If it is on the opponent's corner (left) (S12; NO), a game scene of the opponent's corner (left) is selected (S15) and transmitted to the digital portable phone 61 (S16).

Figure 7A:
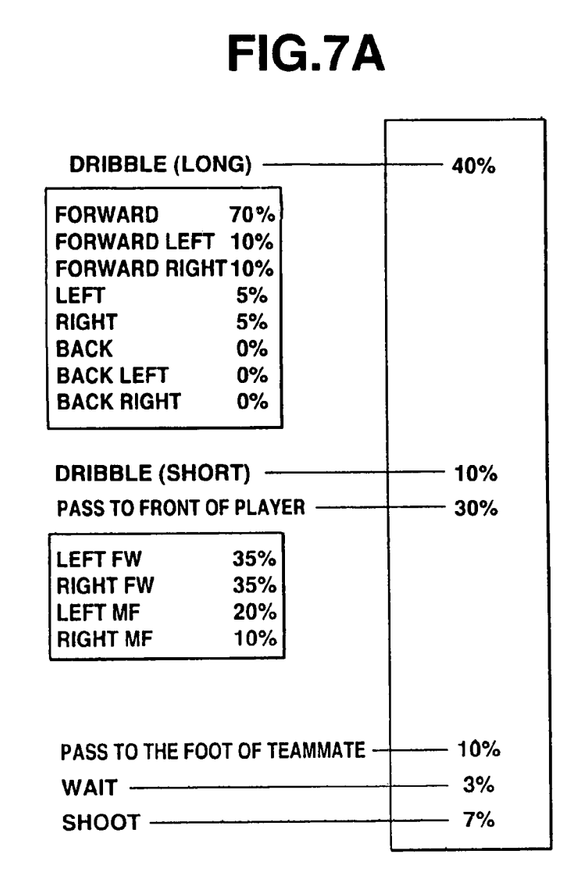
FIG. 7 is an explanatory diagram of action patterns.

FIG. 7 is an explanatory diagram for describing the situation in which the action patterns are updated, and displays the probabilities of any of the six options being selected at the time of kickoff. FIG. 7A shows the action pattern of the gamer before the game begins. This action pattern is based on the gamer's past game history and statistically shows the probabilities of the gamer selecting any of the options in each game scene. In the example shown in FIG. 7A, the probability of "dribble (long)" being selected is 40%, the probability of "dribble (short)" being selected is 10%, the probability of "passing in front of the player" is 30%, the probability of "passing to the foot of the player" is 10%, the probability of "waiting" is 3%, and the probability of "shooting" is 7%. Furthermore, when "dribble (long)" is selected, the probability of the dribble direction being "forward" is 70%, the probability of it being "forward left" is 10%, the probability of it being "forward right" is 10%, the probability of it being "left" is 5%, the probability of it being "right" is 5%, the probability of it being "backward" is 0%, the probability of it being "backward left" is 0%, and the probability of it being "backward right" is 0%. When "pass in front of the player" is selected, the probability of the teammate passed to being the "left FW" is 35%, the probability of him being the "right FW" is 35%, the probability of him being the "left MF" is 20%, and the probability of him being the "right MF" is 10%.

Figure 7B:
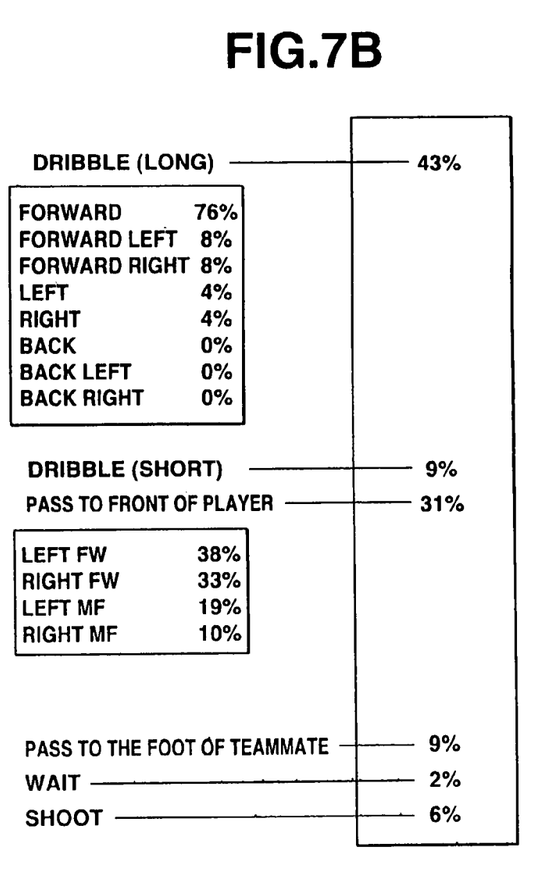

FIG. 7B shows the action pattern at the end of the game, where the probability of "dribble (long)" being selected is 43%, the probability of "dribble (short)" being selected is 9%, the probability of "passing in front of the player" is 31%, the probability of "passing to the foot of the player" is 9%, the probability of "waiting" is 2%, and the probability of "shooting" is 6%. Furthermore, when "dribble (long)" is selected, the probability of the dribble direction being "forward" is 76%, the probability of it being "forward left" is 8%, the probability of it being "forward right" is 8%, the probability of it being "left" is 4%, the probability of it being "right" is 4%, the probability of it being "backward" is 0%, the probability of it being "backward left" is 0%, and the probability of it being "backward right" is 0%. When "pass in front of the player" is selected, the probability of the teammate passed to being the "left FW" is 38%, the probability of him being the "right FW" is 33%, the probability of him being the "left MF" is 19%, and the probability of him being the "right MF" is 10%.

In the example above, the gamer selected "dribble (long)" from the six options at kickoff and then selected "forward" as the dribble direction, so the probability of "dribble (long)" being selected is updated from 40% to 43% with an increase in the number of times "dribble (long)" is selected. Also, the probability of "forward" being selected is updated from 70% to 76% with an increase in the number of times "forward" is selected as the dribble direction.

At the same time, the game server 10 refers to the action patterns of a third person and determines which of the options they would select in any of the game scenes. This third person can be designated by the gamer in advance or can be appropriately selected from a database by the game server 10. The action patterns of this third person are also the result of statistically calculating the probability of any of the options being selected in each game scene, as shown in FIG. 7. The action patterns of the third person show the probability of the game server 10 selecting any of the options in each game scene in order for the game server 10 to develop the game based on the action patterns of the third person.

Figure 4C:
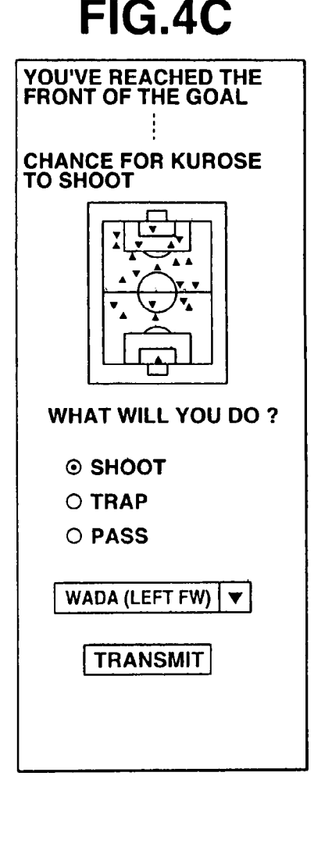
Figure 6:
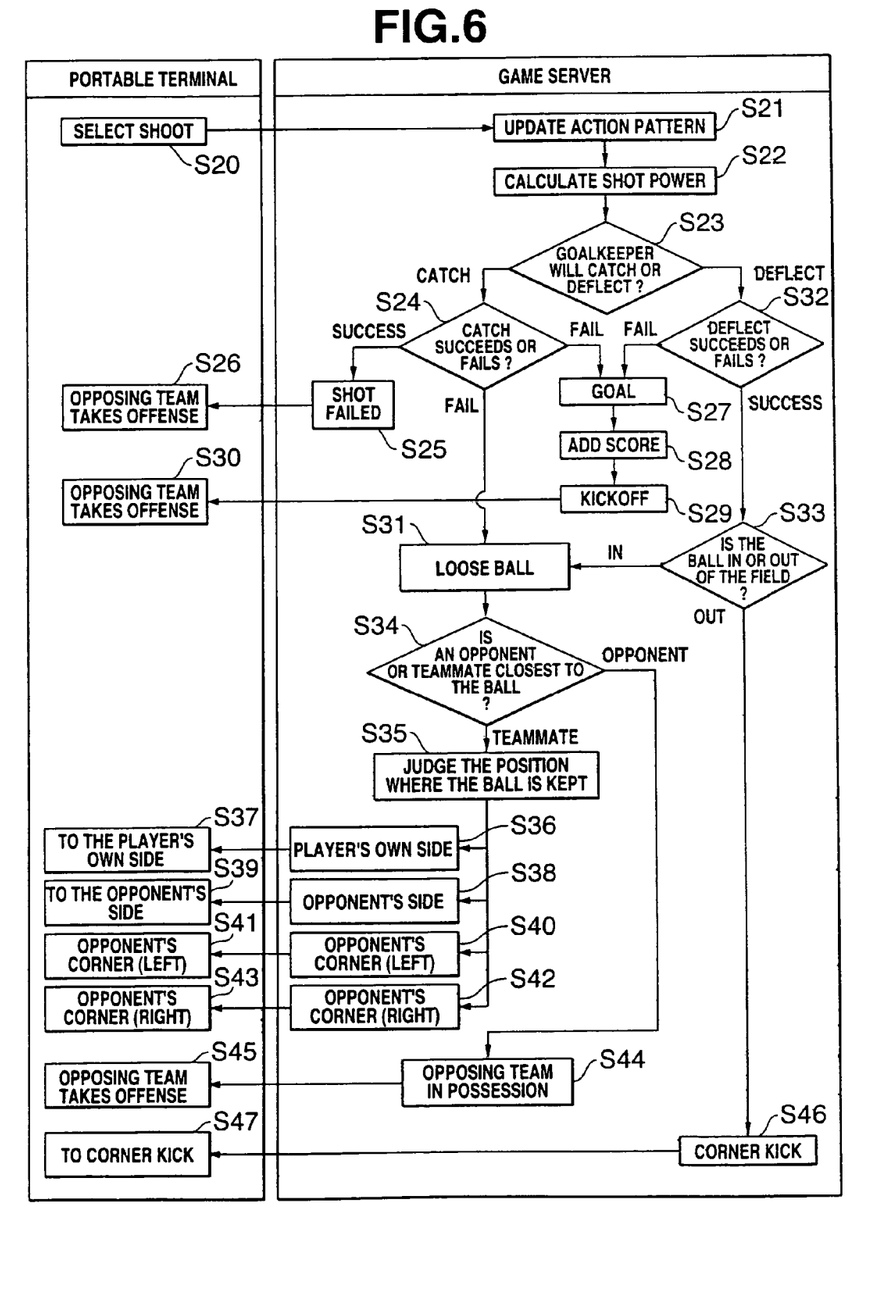
FIG. 6 is a diagram of the correspondence between a portable phone and the game server.

The screen in FIG. 4C is displayed as the game proceeds and a player character reaches the area in front of the goal of the opposing team. Three options, "shoot," "trap," and "pass," are displayed as the actions the player character can take next. This example assumes the gamer chooses "shoot" from the options. FIG. 6 is a diagram of the communication between the digital portable phone 61 and the game server 10. If the gamer selects "shoot" (S20), the game server 10 newly updates the action pattern in front of the goal (S21) by updating the probability of the "shoot" being selected. The power of the shot is then calculated based on the level of the player character and the distance to the goal from the shooting position (S22), and it is determined whether the goalkeeper will catch or deflect the ball (S23). This decision is made by referring to the action patterns of "The Kobe Falcon" and selecting the action with the higher probability of being chosen.

When the probability of catching the ball is high, the game server 10 selects catching and determines whether the catch will succeed or fail based on the level of the goalkeeper (S24). When the catch succeeds, the screen for a failed shot is displayed (S25) and the opposing team takes the offense (S26). Conversely, when the catch fails and a goal is scored (S27), the score is added (S28), the kickoff scene is displayed (S29), and the opposing team takes the offense (S30). A loose ball occurs when the catch fails but a goal is not scored (S31).

When the probability of deflecting the ball is high, the game server 10 selects deflecting and determines whether the deflect will succeed or fail based on the level of the goalkeeper (S32). When the deflect fails and a goal is scored (S27), the score is added (S28), the kickoff scene is displayed (S29), and the opposing team takes the offense (S30). When the deflect succeeds, the game server 10 determines whether the ball ends up within or outside of the field boundaries (S33). When the ball is out of the field, a corner kick screen is displayed (S46), transferring to a corner kick scene (S47).

When the catch fails, resulting in a loose ball, or when the deflect succeeds and the soccer ball ends up within the field boundaries, it is determined whether the player character closest to the soccer ball is an opponent or a teammate (S34). When it is a teammate, the position at which the player character keeps the soccer ball (S35) is determined. If it is on the player's own side of the field (S36), a transfer to the scene of the player's side is implemented (S37), and if it is the opponent's side (S38), a transfer to the scene of the opponent's side is implemented (S39). If it is the opponent's corner (left) (S40), a transfer to the scene of the opponent's corner (left) is implemented (S41), and if it is the opponent's corner (right) (S42), a transfer to the scene of the opponent's corner (right) is implemented (S43). When the player character closest to the soccer ball is an opponent, a screen of the opposing team in possession of the soccer ball is displayed (S44), and the opposing team takes the offense (S45).

The example above depicted a game scene in front of the opposing team's goal at kickoff, but the system is not limited thereto and can also display other options. In the opposing team's corner, the options "center," "dribble," and "wait" are offered; when a pass is received in front of the opposing team's goal, the options "shoot," "trap," and "pass" are offered; in a decisive scene where player characters face off one-on-one, the options "faint to get by," "pass," and "keep" are offered; in a free kick scene, the options "shoot" and "pass" are offered; and in a penalty kick scene, the options "kick left," "kick right," and "kick to the middle" are offered. When one option is selected from the plurality of options offered in each game scene, the corresponding action pattern is updated.

Thus, a plurality of options for the actions the player character can take in every game scene is offered, and the action patterns are successively updated whenever the gamer selects an option, which makes it possible for the game server 10 to store and learn gamer habits together with the game strategies, selection tendencies, and options in every game scene. The system may also be configured such that conditions are set and action patterns are stored and updated based on whether or not an opposing player is in the way of a shot in the same game scene (for example, the scene in front of the opposing team's goal). Setting conditions for the same game scene in this manner makes it possible for the game server 10 to store and learn the action patterns of the gamer in further detail.

If these action patterns are stored for every gamer that plays the game, the game server 10 can enact game development reflecting the action patterns of a specific person. For example, having the game server 10 store the action patterns of gamer A makes it possible for gamer B to compete with the game server 10 as if he were competing with gamer A when gamer B plays the soccer game with the game server 10 via the network. Thus, according to the present embodiment, the game can be more interesting and enjoyable since the gamer can engage in simulated competition with a specific person.

Thus, the gamer can realize his own weak points because the game server 10 mails appropriate advice about the gamer's weak points, the opponent's strategies, and the like by analyzing action patterns, which helps the gamer to improve. Such appropriate advice is an incentive to play the game, so the gamers will not tire of the game and can enjoy playing it. Furthermore, the above-mentioned advice is effective when mailed as advice from the certified player who achieved a game score at a specific level.

Methods for displaying the above-mentioned game screen on the digital portable phone 61 include the following: a Web screen created in portable terminal markup language is transmitted from the game server 10 to the digital portable phone 61; (2) a game program (Java applet) residing in the digital portable phone 61 creates and displays the game screen; and (3) the game server 10 moves the player characters, soccer ball, and the like in virtual space based on the options selected by the gamer, calculates the game scene matching the situation in 3D (three-dimensionally), and transmits an image of this scene rendered into a 2D (two-dimensional) screen to the digital portable phone 61.

The description above depicted a scenario in which a network connection is established from the digital portable phone 61 to the game server 10 for playing a game, but the system may also be designed such that the game can be played by providing the functions of the game server 10 to the arcade game machine 43 having communication functions, and connecting to the arcade game machine 43 from the digital portable phone 61 via the packet communication network 30.

In the description above, the action patterns of the gamer corresponding to the game development were obtained by offering a plurality of options (FIG. 4B, FIG. 4C) to the digital portable phone 61 and counting the number of times these options were selected (FIG. 7), but the present invention need not be limited thereto and may, for example, store the input patterns of key operations set up in an input operation controller associated with a home game apparatus, or in a commercial video game machine, portable phone, or other such mobile communication terminal, and obtain the action patterns of the gamer from past statistical data. Specifically, in FIG. 1, when a network connection is established from the game machine 73 to the game server 10 to play the above-mentioned soccer game, the gamer can select the actions of the player characters by combining the operations of the A button, B button, and C button, or the directional keys set up on the controller ("up," "down," "right," "left"). For example, pressing the A button while operating the directional key "up" and "right" results in a pass to a teammate character or the like.

The game server 10 stores the operating information (in the example above, pressing the A button while operating the directional key "up" and "right") of the gamer and learns the action patterns of the gamer for every game scene. These combinations of key inputs are not displayed on the game screen, as shown in FIG. 4B and FIG. 4C, but the action patterns of the gamer can be obtained by associating the combinations of key operations with the player characters actions in advance.

The action patterns of the gamer can be obtained not only from key operations, but also, for example, from the number of times a cursor is moved or an icon or check button is clicked using a mouse (peripheral device) for a personal computer or other such multipurpose terminal apparatus, or the number of times the trigger is pulled on a gun-style controller for a shooting game, or the angle at which the steering wheel is turned and the way the accelerator and brake are stepped on in a car racing game.

In the above description, a competitive game was described in the examples, but the present invention can also be applied to games in which a plurality of gamers cooperate to make progress, such as a role-playing game or the like.

INDUSTRIAL APPLICABILITY

According to the present invention, storing the action patterns of a first operator in advance makes it possible for a second operator to have a virtual experience as if he were gaming with the first operator. Offering a plurality of options for the actions the operator can take in every game scene makes it possible to statistically calculate the action patterns from the number of times options are chosen. The operator can also improve his skills due to the delivery of beneficial information based on the action patterns of the operator whenever the gamer plays.

According to the present invention, an incentive to participate in the game against the gamer can be provided since the functions of the gamer's homepage are expanded according to the game scores. The gamer can also stimulate communication through the homepage.

According to the present invention, the gamer can obtain information that identifies among gamers playing a game at gaming establishments, game scores, the number of gamers playing, the operating conditions of the gaming establishment, and other such information from a terminal apparatus connected to a communication network, so the gamer can search for gaming establishments with popular games, gaming establishments with competitive gamers, gaming establishment with many gamers at a similar level, gaming establishments with many skilled gamers, and the like.

According to the present invention, an incentive for game participation can be provided since gamers are certified as gamers at a specific level when they reach this level.

Gamers of a similar skill level can form a team and compete for game scores within the team, whereby they can efficiently focus on improving their skills.

The invention claimed is:

1. A game management system, executable on a server, wherein the server is configured with:
   a first network connection means connectable to a plurality of game machines including ones located at a plurality of game facilities that are at separate locations from one another, wherein the game machines are arranged to read identification information from an identification means before a gamer plays a game on one of the game machines, and to transmit the identification information to the server via the first network connection means;
   a second network connection means connectable to personal terminal devices operable independently from the game machines;
   a web page means; and
   a database,
   the game management system being configured to:
   (a) allow a personal terminal device operable independently from the game machines to send personal information of the gamer including a name or nickname of the gamer, which is to appear on the web page, to the second network connection means by relating the personal information to the identification information stored in the identification means, while restricting sending the personal information to the first network connection means from any of the game machines;
   (b) cause the database to store the personal information of the gamer by relating the personal information to the identification information when transmitted from the personal terminal device by way of the second network connection means;
   (c) cause the game machine operated by the gamer to transmit the identification information read from the identification means to the server by way of the first network connection means if the gamer allows the game machine to read the identification information before starting the game;
   (d) confirm if the identification information transmitted from the game machine operated by the gamer by way of the first network connection means corresponds to the personal information sent from the personal terminal device by way of the second network connection means;
   (e) collect play information from the game machine on which the gamer has started the game, the play information including location information relating to the game facility at which the one of the game machines is located and information regarding the game plays performed on the one game machine, the play information being transmitted by way of the first network connection means to the server by relating the play information to the identification information read from the identification means and transmitted to the server;
   (f) cause the web page means to provide a web page that includes the collected play information, which includes information regarding the game plays performed by the gamer and regarding the game facility that the gamer currently visits, by relating such information on the web page to the name or nickname of the gamer that is stored in the server as the personal information to appear on the web page, by relating the personal information to the confirmed identification information; and
   (g) allow another personal terminal device operable independently from the game machines and possessed by another gamer, who currently visits another game facility, to access the web page by way of the second network connection means, while restricting access to the web page by way of the first network connection means from any of the game machines.

2. The game management system of claim 1, wherein the web page is transmitted to personal terminal devices registered to the server apparatus.

3. The game management system of claim 1, wherein the web page is transmitted to a personal terminal device operable by another gamer who plays the game on another game apparatus at another game facility.

4. A game management system, comprising:
   a first network connection mean connectable to a plurality of game machines including ones located at a plurality of game facilities that are at separate locations from one another, wherein the plurality of game machines are arranged to read identification information from an identification means before a user plays a game on one of the game machines, and to transmit the identification information to the first network connection means;
   a second network connection means connectable to personal terminal devices operable independently from said game machines;
   a web page means; and
   a database,
   the game management system being configured to:
   (a) allow a personal terminal device operable independently from the game machines to send personal information of the user including a name or nickname of the user, which is to appear on the web page, to the second network connection means by relating the personal information to identification information, which is stored in the identification means belonging to the user, while restricting sending of the personal information to the first network connection means from any of the game machines;
   (b) cause the database to store the received personal information in connection with the identification information that was sent from the personal terminal device by way of the second network connection means;
   (c) cause the game machine operated by the user to transmit the identification information read from the identification means to the server by way of the first network connection means if the user allows the game machine to read the identification information before starting the game;
   (d) confirm if the identification information that was transmitted from the game machine by way of the first network connection means corresponds to the personal information sent from the personal terminal device by way of the second network connection means;

(e) collect play information from the game machine on which the user has started the game, the play information including information regarding the game facility at which the game machine is located, and information of the game plays performed on the game machine, the play information being sent from the game machine by way of the first network connection means to the server by relating the identification information that was read from the identification means and transmitted to the server;

(f) cause the web page means to provide a web page that includes information of the collected play information and of the game facility which the user currently visits, by relating such information on the web page to the name or nickname of the user that was sent as the personal information to appear on the web page, by relating the personal information to the confirmed identification information; and (g) allow another personal terminal device operable independently from the game machines and possessed by another user, who currently visits another game facility, to access the web page by way of the second network connection means, while restricting access to the web page by way of the first network connection means from any of the game machines.

5. A game management system executable on a server, wherein the server is configured with:

a first network connection means connectable to a plurality of game apparatuses including ones located at a plurality of game facilities that are at separate locations from one another, wherein the game apparatuses are arranged to read identification information from a game card before a gamer plays a game on one of the game apparatuses, and to transmit the identification information to the server via the first network connection means;

a second network connection means connectable to personal terminal devices operable independently from the game apparatuses;

a web page means; and a database, wherein the game management system is configured to:

(1) allow a personal terminal device operable independently from the game apparatus to send personal information of the gamer including a name or nickname of the gamer, which is to appear on the web page, to the second network connection means by relating the personal information to the identification information stored on the game card, while restricting sending the personal information to the first network connection means from any of the game machines;

(2) cause the database to store the personal information of the gamer by relating the personal information to the identification information when transmitted by way of the second network connection means from the personal terminal device;

(3) cause the game apparatus operated by the gamer to transmit the identification information read from the game card to the server by way of the first network connection means if the gamer allows the game apparatus to read the identification information before starting the game;

(4) confirm if the identification information, read by the game apparatus from the game card corresponds to the personal information sent from the personal terminal device by way of the second network connection means;

(5) collect play information from the game apparatus on which the gamer has started the game, the play information including location information relating to the game facility at which the game apparatus is located and information regarding the game plays performed on the game apparatus, the play information being transmitted by way of the first network connection means to the server in association with the transmitted identification information of the game card;

(6) cause the web page means to provide a web page that includes the collected play information, which includes information regarding the game plays performed by the gamer and regarding the game facility which the gamer currently visits, by relating the information on the web page to the name or nickname of the gamer that is stored in the server as the personal information to appear on the web page, by relating the personal information to the confirmed identification information; and (7) allow another personal terminal device operable independently from the game apparatuses and possessed by another gamer, who currently visits another game facility, to access the web page while restricting access to the web page by way of the first network connection means from any of the game apparatuses.

6. The game management system of claim 4, further configured to:

(h) allow the user to configure and modify information regarding game play of the user stored on the server by way of the second network connection means from the personal terminal device, while restricting the configuration and modification of information by way of the second network connection means from any of the game machines; and (i) allow the user to start the game using the configured or modified information for the own game play of the user on the game machine.

* * * * *